US009494463B2

(12) United States Patent
Hamilton

(10) Patent No.: US 9,494,463 B2
(45) Date of Patent: *Nov. 15, 2016

(54) OPTICAL EMISSION SPECTROSCOPIC (OES) INSTRUMENT WITH AUTOMATIC TOP AND BOTTOM SLIT CURTAINS

(71) Applicant: Thermo Scientific Portable Analytical Instruments Inc., Tewksbury, MA (US)

(72) Inventor: Mark A. Hamilton, Upton, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 140 days.

This patent is subject to a terminal disclaimer.

(21) Appl. No.: 14/293,405

(22) Filed: Jun. 2, 2014

(65) Prior Publication Data

US 2014/0268132 A1 Sep. 18, 2014

Related U.S. Application Data

(63) Continuation-in-part of application No. 14/132,618, filed on Dec. 18, 2013, now abandoned, which is a
(Continued)

(51) Int. Cl.
*G01J 3/04* (2006.01)
*G01J 3/02* (2006.01)
(Continued)

(52) U.S. Cl.
CPC .............. *G01J 3/0229* (2013.01); *G01J 3/027* (2013.01); *G01J 3/0237* (2013.01); *G01J 3/0264* (2013.01); *G01J 3/0272* (2013.01); *G01J 3/0289* (2013.01); *G01J 3/0291* (2013.01); *G01J 3/04* (2013.01); *G01J 3/06* (2013.01); *G01J 3/443* (2013.01)

(58) Field of Classification Search
CPC .......... G01J 1/0266; G01J 1/04; G01J 3/0229; G01J 3/443; G01J 1/0437; G01J 1/0448

See application file for complete search history.

(56) References Cited

U.S. PATENT DOCUMENTS 3,815,995 A   6/1974  Walters et al.
4,352,561 A * 10/1982  Tohyama .................. G01J 3/04
                                                                                  356/332
(Continued)

OTHER PUBLICATIONS

U.S. Appl. No. 12/036,039 titled "Hand-Held, Self-Contained Optical Emission Spectroscopy (OES) Analyzer," filed Feb. 22, 2008.

*Primary Examiner* — Kara E Geisel
*Assistant Examiner* — Maurice Smith
(74) *Attorney, Agent, or Firm* — Ion C. Abraham

(57) ABSTRACT

An optical emission spectroscopic (OES) instrument includes a spectrometer, a processor and an adjustable mask controlled by the processor. The adjustable mask defines a portion of an analytical gap imaged by the spectrometer. The instrument automatically adjusts the size and position of an opening in the mask, so the spectrometer images an optimal portion of plasma formed in the analytical gap, thereby improving signal and noise characteristics of the instrument, without requiring tedious and time-consuming manual adjustment of the mask during manufacture or use.

8 Claims, 14 Drawing Sheets

Related U.S. Application Data continuation of application No. 12/771,846, filed on Apr. 30, 2010, now Pat. No. 8,649,007.

(60) Provisional application No. 61/176,442, filed on May 7, 2009.

(51) Int. Cl.
*G01J 3/443* (2006.01)
*G01J 3/06* (2006.01)

(56) References Cited

U.S. PATENT DOCUMENTS

| | | |
|---|---|---|
| 4,531,836 A | 7/1985 | Smith, Jr. et al. |
| 6,020,958 A | 2/2000 | Tobe et al. |
| 7,636,158 B1 * | 12/2009 | Pawluczyk ............... G01J 3/02 356/326 |
| 2004/0026616 A1 | 2/2004 | Marcus et al. |
| 2004/0150817 A1 | 8/2004 | Smith et al. |
| 2005/0162628 A1 * | 7/2005 | Sano ................... G03F 7/70066 355/53 |
| 2007/0019194 A1 | 1/2007 | Chen et al. |
| 2008/0049220 A1 | 2/2008 | Izzia et al. |

* cited by examiner

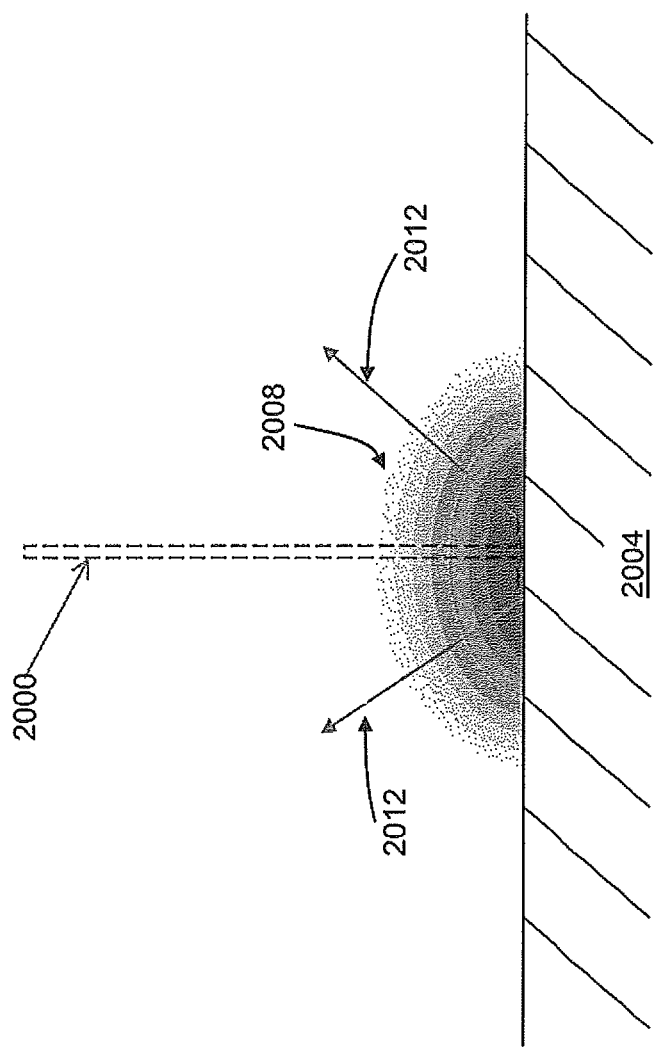

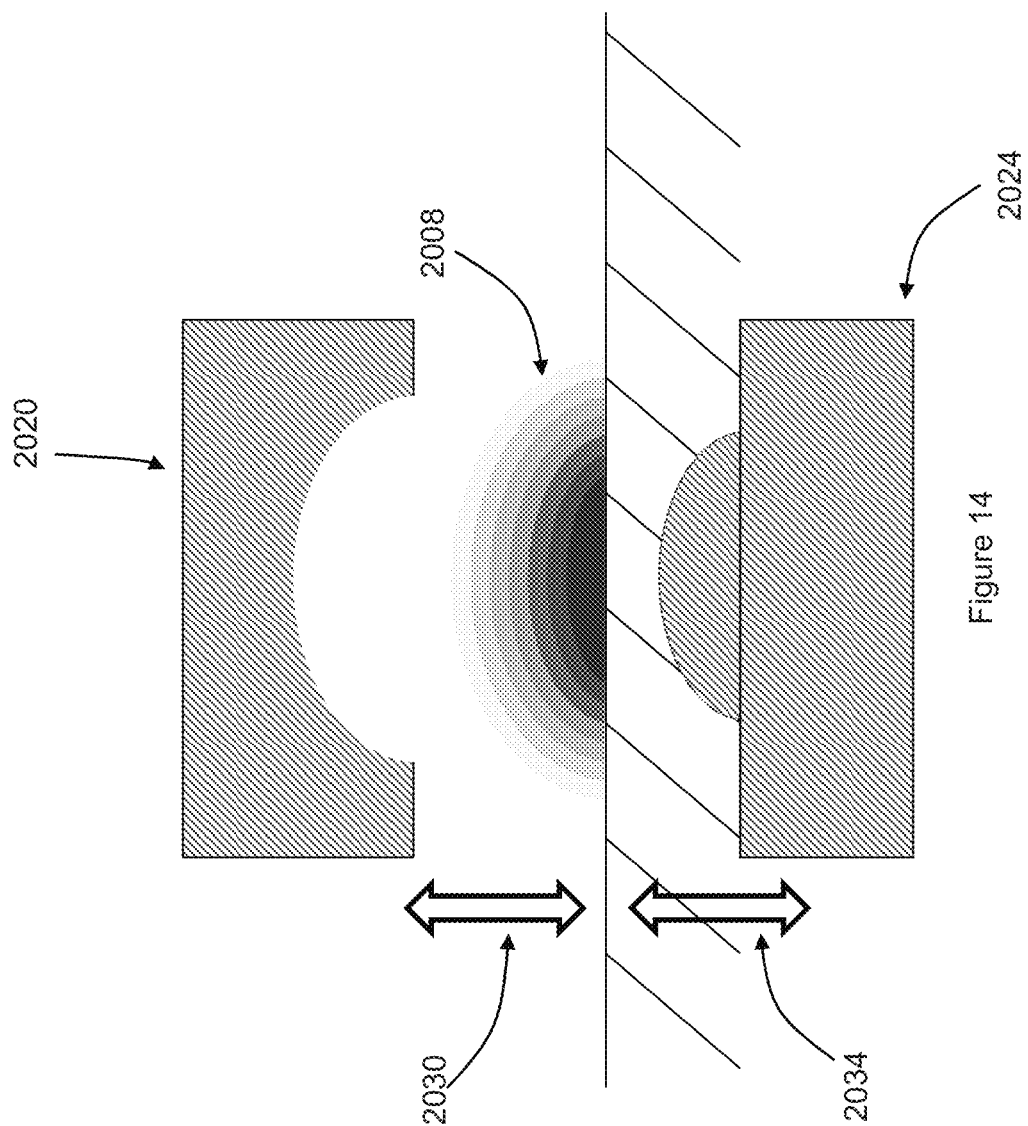

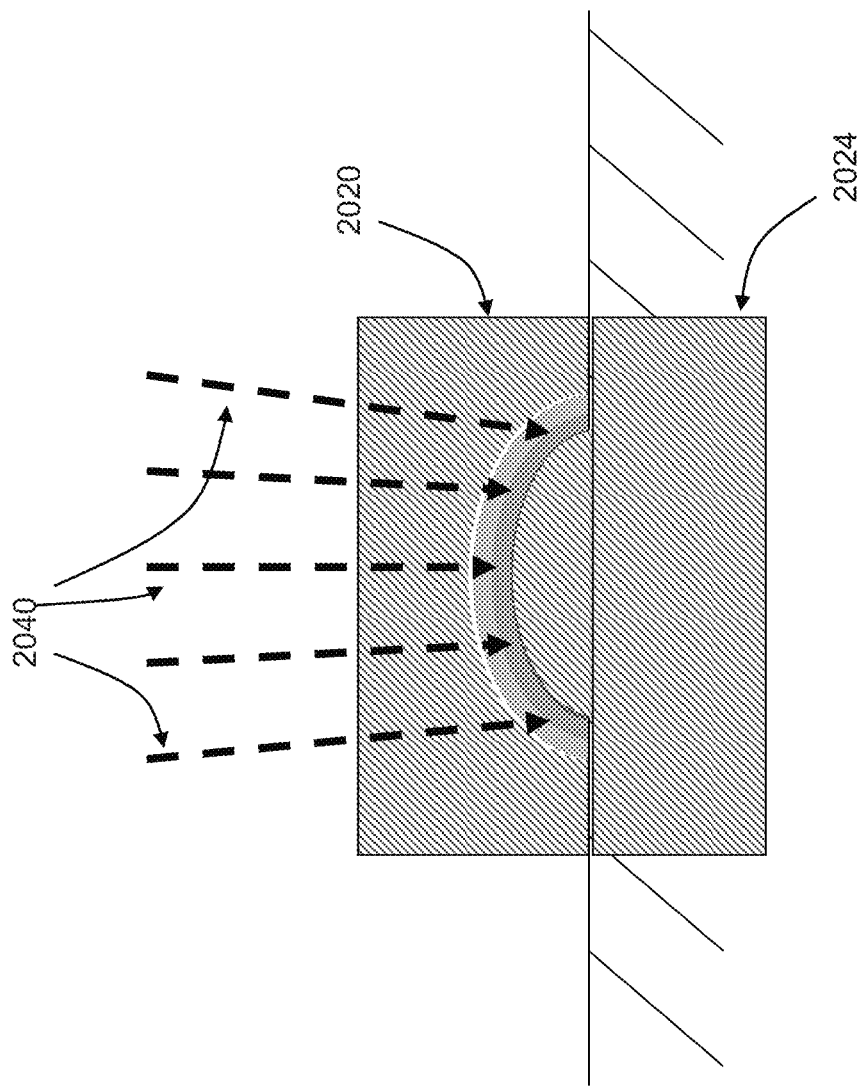

OPTICAL EMISSION SPECTROSCOPIC (OES) INSTRUMENT WITH AUTOMATIC TOP AND BOTTOM SLIT CURTAINS

CROSS-REFERENCE TO RELATED APPLICATION

This application is a continuation in part of pending U.S. patent application Ser. No. 14/132,618 filed Dec. 18, 2013, which is a continuation of pending U.S. patent application Ser. No. 12/771,846, filed Apr. 30, 2010 granted as U.S. Pat. No. 8,649,007 on Feb. 11, 2014 and which claims the priority benefit under 35 U.S.C. §119(e) of U.S. Provisional Patent Application Ser. No. 61/176,442 by Mark A. Hamilton. The present application claims priority from all the foregoing applications, the disclosures of which are incorporated herein by reference.

TECHNICAL FIELD

The present invention relates to optical emission spectroscopic (OES) instruments and, more particularly, to such instruments that automatically adjust top and/or bottom curtains of an optical mask for a spectrometer, in response to analyses of optical signals analyzed by the spectrometer.

BACKGROUND ART

Analyzing chemical compositions of samples is important in many contexts, including identifying and segregating metal types (particularly various alloys of iron and steel) in outdoor metal recycling facilities, quality control testing in factories and forensic work. Several analytical methods are available.

Optical emission spectroscopy (OES) is a mature, robust technology for the elemental analysis of materials. In OES, a small quantity of sample material is vaporized and excited above atomic ground state. Emissions characteristic of elements in the vaporized sample are captured by a light guide, which sends the light to a spectrometer, which produces and analyzes a spectrum from the light, so as to yield information about the elemental composition.

For electrically conductive samples, prevalent techniques for generating emission spectra use either an electric arc or a spark, or both, to vaporize a small quantity of the sample to be analyzed. An electrical potential in an analytical gap between a counterelectrode and a surface of the sample breaks down gas in the gap, enabling an electrical current, in the form of a spark or an arc or both, to flow between counterelectrode and the sample surface. Typically, the spark or arc vaporizes a portion of the sample and causes the vaporized sample to move into the analytical gap, and thereafter heats the gas in the gap, thereby exciting the vaporized sample material. In the resulting plasma, the excited sample ("analyte") produces an optical (although possibly invisible) discharge that is characteristic of the elemental composition of the excited material.

Alternatively, laser-induced breakdown spectroscopy (LIBS) or glow discharge (GD) may be used to vaporize and excite an emission sample. A survey of OES analytical techniques may be found in K. Slickers, "Automatic Atomic-Emission Spectroscopy", Second Edition (1993), which is incorporated by reference as if fully set forth herein for all purposes.

Regardless which excitation technique is used, an image of the excited sample is projected onto an entrance slit of a spectrometer, which analyzes composition of the sample, based on wavelengths and intensities of the optical signal. Emissions from the analyte should be sampled from a volume of the analytical gap where the analyte is ionized. Optical signals from other sources, such as the heated tip of the counterelectrode or the sample surface, could confuse the analysis and should not, therefore, be allowed to enter the spectrometer.

A mask and/or a suitably short slit may be used to exclude these unwanted emissions. However, masks and short slits limit the amount of optical signal received by the spectrometer, leading to poor signal-to-noise ratios.

SUMMARY OF THE INVENTION

An embodiment of the present invention provides a method for automatically adjusting a field of view of an optical emission spectroscopic instrument. The instrument defines an analytical gap. A spectrometer in the instrument is configured to analyze an optical signal produced within the analytical gap and to generate an output signal representative of the analysis. An adjustable mask is disposed in a light path of the instrument. The mask adjustably defines a portion of the analytical gap that is imaged by the spectrometer. The mask is adjusted under control of a processor.

A constituent of a sample may be identified, under control of the processor, based on the output signal. The mask may be adjusted, based on the identified constituent. The constituent may be identified during a surface preparation phase.

A plurality of time-separated output signals may be analyzed, under control of the processor. The mask may be adjusted between each pair of successive output signal analyses. For example, the mask may be adjusted between each pair of successive output signal analyses, such that after adjusting the mask, the spectrometer images a different, but equal sized, portion of the analytical gap, or a different sized portion of the analytical gap.

The mask may be adjusted until a predetermined criterion is met, relative to the output signal. For example, the mask may be adjusted until a predetermined noise or signal-to-noise or signal level criterion is met, relative to the output signal.

The mask may be adjusted until a predetermined signal level criterion is met, and then the mask may be further adjusted until a predetermined signal-to-noise criterion is met.

The mask may include at least one curtain. Adjusting the mask may involve opening or closing the at least one curtain until a predetermined noise or signal level or signal-to-noise criterion is met, relative to the output signal.

The mask may include at least two curtains. Adjusting the mask may involve opening or closing one of the curtains until a first predetermined noise or signal level or signal-to-noise criterion is met, relative to the output signal, and then opening or closing another of the curtains until a second predetermined noise or signal level or signal-to-noise criterion is met, relative to the output signal.

The mask defines an opening. Adjusting the mask may involve adjusting the mask so as to translate the opening until a predetermined noise or signal level or signal-to-noise criterion is met, relative to the output signal. At least one of the curtains may at least partially define the opening. The at least one curtain may be opened or closed until a first predetermined noise or signal level or signal-to-noise criterion is met, relative to the output signal.

The mask may include at least two curtains at least partially defining the opening. Another of the curtains may be opened or closed until a second predetermined noise or signal level or signal-to-noise criterion is met, relative to the output signal.

Another embodiment of the present invention provides a self-adjusting optical emission spectroscopic instrument for analyzing composition of a portion of a sample. The instrument includes an exciter, a spectrometer, an adjustable mask and a processor. The exciter is capable of exciting the portion of the sample within an analytical gap. The excitation produces an optical signal. The spectrometer is disposed in the instrument to receive the optical signal. The spectrometer disperses the optical signal and produces an output signal from the dispersed optical signal. Then adjustable mask is also disposed in the instrument, along a path of the optical signal. The adjustable mask adjustably defines a portion of the analytical gap imaged by the spectrometer. The processor is coupled to the spectrometer and to the mask. The processor is programmed to process the output signal and to adjust the mask.

The processor may also be programmed to identify a constituent of a sample based on the output signal, as well as to adjust the mask based on the identified constituent. The processor may also be programmed to identify the constituent of the sample during a surface preparation phase.

The processor may also be programmed to analyze a plurality of time-separated output signals and to adjust the mask between each pair of successive output signal analyses. The processor may be programmed to adjust the mask between each pair of successive output signal analyses, such that the spectrometer images a different, but equal sized, portion of the analytical gap, or such that the spectrometer images a different sized portion of the analytical gap.

The processor may be programmed to adjust the mask until a predetermined criterion is met, relative to the output signal. For example, the processor may be programmed to adjust the mask until a predetermined noise or signal-to-noise or signal level criterion is met, relative to the output signal.

The processor may be programmed to adjust the mask until a predetermined signal level criterion is met, and then to adjust the mask until a predetermined signal-to-noise criterion is met.

The mask may include at least two curtains. The processor may be programmed to open or close one of the curtains until a first predetermined noise or signal level or signal-to-noise criterion is met, relative to the output signal. The processor may be further programmed to open or close another of the curtains until a second predetermined noise or signal level or signal-to-noise criterion is met, relative to the output signal.

The mask may define an opening. The processor may be programmed to adjust the mask so as to translate the opening until a predetermined noise or signal level or signal-to-noise criterion is met, relative to the output signal. The mask may include at least one curtain at least partially defining the opening. The processor may be programmed to open or close the at least one curtain until a first predetermined noise or signal level or signal-to-noise criterion is met, relative to the output signal.

The mask may include at least two curtains at least partially defining the opening. The processor may be programmed to open or close another of the curtains until a second predetermined noise or signal level or signal-to-noise criterion is met, relative to the output signal.

Yet another embodiment of the present invention provides a computer program product for use on a computer for automatically adjusting a field of view of an optical emission spectroscopic instrument. The instrument defines an analytical gap and including a spectrometer. The spectrometer is configured to analyze an optical signal produced within the analytical gap. The spectrometer generates an output signal representative of the analysis. The instrument further including an adjustable mask in a light path of the instrument. The mask adjustably defines a portion of the analytical gap imaged by the spectrometer. A tangible computer usable medium has computer readable program code stored thereon. When the program code is executed by the computer, the computer adjusts the mask.

The tangible computer usable medium may have additional computer readable program code stored thereon. When the program code is executed by the computer, the computer identifies a constituent of a sample based on the output signal. Based on the identified constituent, the computer adjusts the mask.

Optionally or alternatively, when the program code is executed by the computer, the computer analyzes a plurality of time-separated output signals. The computer adjusts the mask between each pair of successive output signal analyses.

The computer may adjust the mask until a predetermined criterion is met, relative to the output signal. For example, the computer may adjust the mask until a predetermined noise or signal-to-noise or signal level criterion is met, relative to the output signal. The computer may adjust the mask until a predetermined signal level criterion is met, and then adjust the mask until a predetermined signal-to-noise criterion is met.

BRIEF DESCRIPTION OF THE DRAWINGS

The invention will be more fully understood by referring to the following Detailed Description of Specific Embodiments in conjunction with the Drawings, of which:

FIG. 13 illustrates how a laser pulse interacts with a sample;

FIGS. 14 and 15 illustrate the use of a mask with two curved curtains.

DETAILED DESCRIPTION OF SPECIFIC EMBODIMENTS

In accordance with embodiments of the present invention, methods and apparatus are disclosed for automatically adjusting a field of view of an optical emission spectroscopic (OES) instrument. The instrument includes a spectrometer and an adjustable mask controlled by a processor. As a result, the instrument may automatically adjust the size and position of an opening in the mask, so the spectrometer images an optimal portion of plasma formed in an analytical gap, thereby improving signal or noise characteristics of the instrument, without requiring tedious and time-consuming manual adjustment of the mask during manufacture or use.

Figure 1:
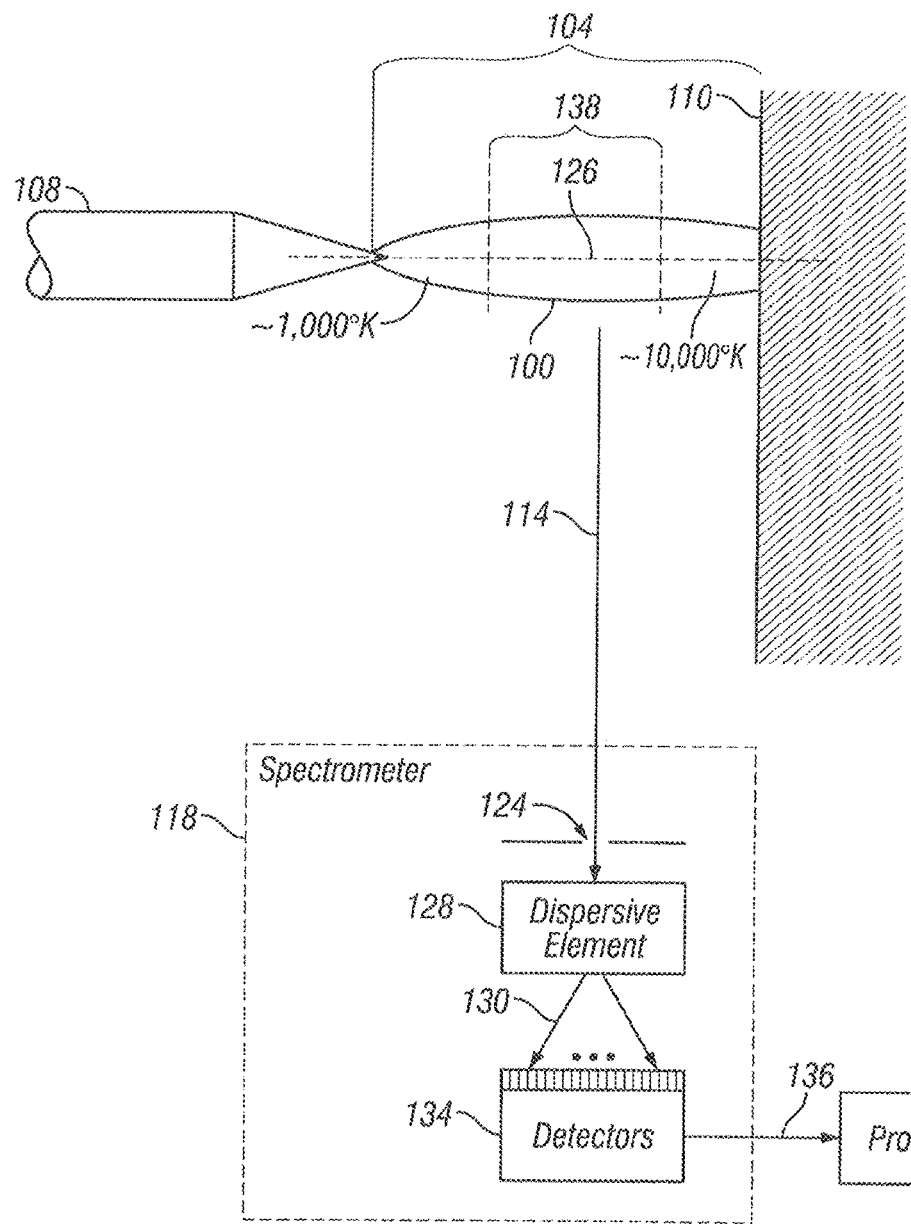
FIG. 1 is a schematic diagram showing components of an optical emission spectroscopy (OES) analyzer, according to an embodiment of the present invention.

As shown in FIG. 1, in arc/spark OES analysis, plasma 100 is formed in an analytical gap 104 between a counterelectrode 108 and a sample surface 110. Light 114 (typically in a range of wavelengths from about 170 nm to about 450 nm, i.e. mostly in the ultraviolet spectrum) from the plasma 100 is analyzed by a spectrometer 118 and a processor 120 to determine elemental composition of the sample 110. An image of the plasma 100 is typically projected onto a slit 124 of the spectrometer, such that the axis 126 of the plasma 100 is aligned with the long axis of the slit 124. A dispersive element 128 (such as a grating or a prism) produces a wavelength-dispersed optical signal (spectrum) 130, which is distributed across a plurality of detectors 134. Each of the detectors 134 is positioned to receive a different, yet narrow, range of wavelengths of the spectrum 130. The detectors 134 produce electrical signals 136 that are fed to the processor 120. As noted, other techniques, such as laser-induced breakdown spectroscopy (LIBS) or glow discharge (GD), may be used to vaporize and excite the sample 110.

Figure 2:
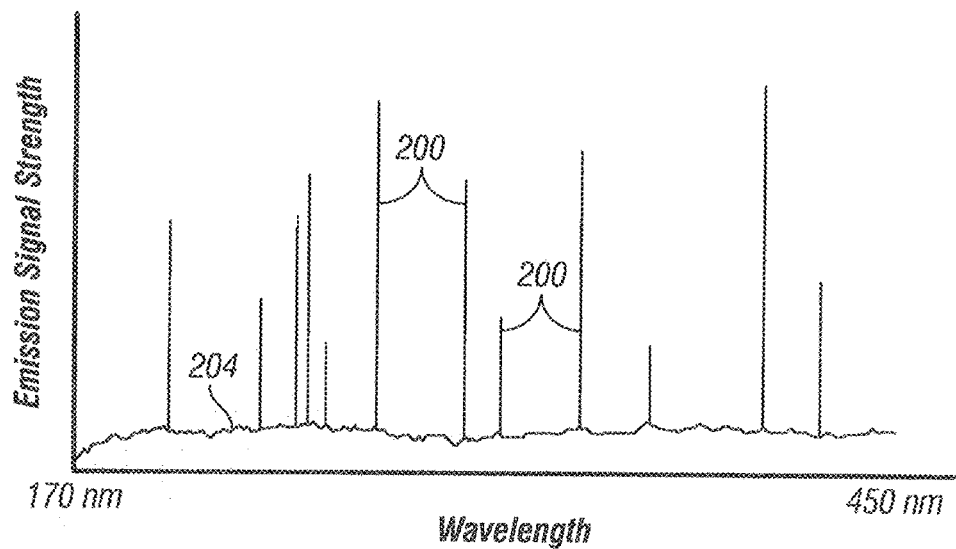
FIG. 2 contains a graph representing a hypothetical emission spectrum with a relatively low noise level.

Excited elements in the plasma 100 emit light at characteristic wavelengths and relative intensities. FIG. 2 contains a graph representing a hypothetical emission spectrum projected onto the detectors 134. Emissions characteristic of the sample 110 appear as relatively tall lines, exemplified by lines 200, that indicate by their heights the amount of light detected at respective wavelengths. By identifying the wavelengths and relative heights of some or all of the lines 200, etc., in the spectrum 130, the processor 120 may ascertain the composition of the sample 110, including identifying relative concentrations of various elemental constituents, thus identifying an alloy or other classification to which the sample 110 belongs.

Other emissions, such as from material eroded from the counterelectrode 108 and from environmental gases present in the analytical gap 104, are typically present in relatively small quantities and, in a well-adjusted analytical instrument, contribute to a relatively low strength background signal ("noise") 204. Noise is also caused by recombination phenomena at the sample surface 110. The ratio of the height of the lines 200, etc., to the amplitude of the noise 204 is commonly referred to as a signal-to-noise ratio ("S/N").

Figure 3:
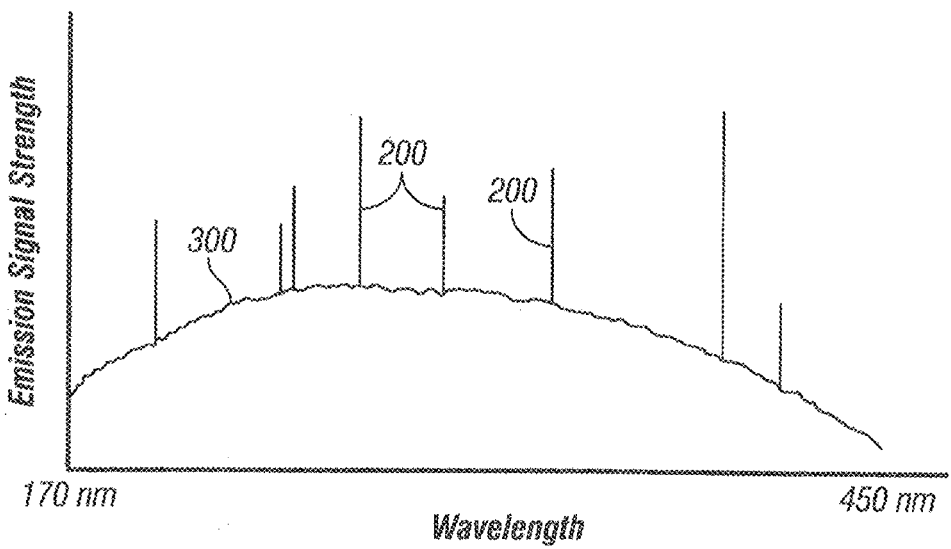
FIG. 3 contains a graph representing a hypothetical emission spectrum with a relatively high noise level.

In a poorly adjusted instrument, the noise level 300 may be high, as shown in FIG. 3. The noise level 300 may be high enough to overwhelm some or all of the lines 200, etc., thus precluding analysis of the sample, or at least reducing accuracy of the analysis.

Returning to FIG. 1, the temperature of the plasma 100 varies along its length. The portion of the plasma 100 close to the tip of the counterelectrode 108 is typically cooler (at about 1,000° K) than the portion of the plasma 100 close to the sample surface 110 (which may be about 10,000° K). Optimum analysis of the spectrum 130 generally requires a relatively high signal-to-noise ratio, which involves allowing as much light as possible from a desired portion 138 of the plasma 100 to reach the spectrometer 118, while preventing optical signals from the ends of the plasma 100, the counterelectrode 108 and the surface 110 from reaching the spectrometer 118. This is often accomplished by disposing a mask along an optical path of the light 114, such that an opening in the mask admits light from the desired portion 138 of the plasma 100, and the mask blocks light from the unwanted portions of the plasma 100. The mask may, for example, be disposed on or near the slit 124 to define effective top and bottom extents of the slit 124.

The location and size of the desired portion 138 of the plasma 100 varies depending on several factors, including the size of the analytical gap 104; the amount of electrical power introduced into the analytical gap; and the base material (such as iron, aluminum, zinc or titanium) of the sample 110. Thus, the optimum size of the mask opening, as well as the optimum locations of the top and bottom portions of the mask, also vary with these factors.

In conventional OES instruments, the positions of the top and bottom portions of the mask, and therefore the size of the mask opening, are fixed, typically during manufacture of the instrument or thereafter when the instrument is serviced. However, such a fixed size and positions combination represents, at best, a compromise among several competing objectives. For example, the mask may be configured to facilitate analyzing both iron-based and aluminum-based samples, although such a mask configuration may not be optimum for either type of sample, inasmuch as a different mask configuration would yield a larger signal-to-noise ratio when analyzing an iron-based sample, and a yet different mask configuration would yield a larger signal-to-noise ratio when analyzing an aluminum-based sample. Furthermore, determining the mask configuration for a given OES instrument typically involves a labor-intensive process due, at least in part, to slight mechanical and other variations among OES instruments. Thus, fixed-size and fixed-position masks pose problems.

These and other problems associated with the prior art may be solved by automatically adjusting the mask under control of the processor 120 in response to the signals 136 received from the spectrometer 118. These automatic adjustments may be made as part of a manufacturing or repair process and/or during normal use. For example, the mask may be adjusted until a predetermined criterion, such as a maximum signal-to-noise ratio, is met. An embodiment of an adjustable mask 300 is shown schematically in FIG. 4. The mask 400 includes two independently adjustable curtains 402 and 404. The positions of the curtains 402 and 404 may be adjusted, as indicated by arrows 408 and 410, to raise or lower edges 414 and 418, respectively, of the curtains 402 and 404, thereby adjusting the size and/or position of the opening 420 in the mask 400. A dashed outline 422 indicates the outer extent of the light 114, i.e., an image of the plasma 100, that would otherwise be processed by the spectrometer 118.

Collectively, the curtains 402 and 404 limit a field of view of the spectrometer 118, i.e., an amount and portion of the analytical gap 104 that is imaged by the spectrometer 118. "Imaged by the spectrometer" means impinging on the dispersive element 128 that produces the spectrum 130 that impinges on the detectors 134. Thus, the curtains 402 and 404 limit the amount and portion of the plasma 100 that is (or would be) imaged by the spectrometer 118. One curtain 402 limits the amount of the counterelectrode 108 side of the plasma 100 that can be imaged by the spectrometer 118, and the other curtain 404 limits the amount of the sample 110 side of the plasma 100 that can be imaged by the spectrometer 118. For example, lowering curtain 402 cuts off progressively more of the plasma 100, beginning with the counterelectrode 108 end of the plasma 100.

The curtains 402 and 404 may, but need not, be capable of opening slightly wider than necessary to image the entire analytical gap 104. That is, the curtains 402 and 404 may be capable of opening wide enough to image a portion of the counterelectrode 108 or a portion of the sample 110, respectively. This capability may be useful when, for example, the counterelectrode 108 becomes shorter through erosion or an operator inadvertently mis-orients the instrument so as to leave a gap between the instrument and the sample surface 110. (Ideally, a snout of the instrument is typically brought into contact with the sample surface 110, leaving no gap between the instrument and the sample surface 110.)

It should be noted that the analytical gap 104 increases in size as the counterelectrode 108 erodes. The size of the analytical gap 104 also depends on the location of the sample surface 110, relative to the tip of the counterelectrode 108. As used herein, the term "analytical gap" means all or any portion of a region that might reasonably be expected to contain plasma when an instrument is in reasonable use, i.e., all or any portion of a region from approximately the tip of the counterelectrode (allowing for reasonable variations in counterelectrode location due to variability of installation of the counterelectrode, and allowing for reasonably expected wear of the counterelectrode) to approximately the sample surface (allowing for reasonable variation in positioning of the instrument, relative to the sample). "Analytical gap" does not necessarily mean the entire region that might contain plasma when an instrument is in reasonable use.

The curtains 402 and 404 may, but need not, be capable of completely closing the opening 420. Furthermore, the maximum excursions of the curtains 402 and 404 may overlap. That is, the maximum downward excursion of the top curtain 402 may place the lower edge 414 of the top curtain 402 lower than the maximum upward excursion of the bottom curtain 404 would place its upper edge 418. However, the curtains 402 and 404 may be operated such that, in use, the curtains never actually overlap each other. The curtains need not be coplanar.

The curtains 402 and 404 also may, but need not, be moved together. For example, both curtains 402 and 404 may be moved the same distance and in the same direction, thereby maintaining a constant size opening 402 between the edges 414 and 418 of the curtains. Such coordinated movement of the two curtains 402 and 404 essentially translates the opening 420, thereby essentially scanning the opening 402 across a portion of the analytical gap 104.

Collectively, the curtains 402 and 404 determine the amount and portion of the analytical gap 104 that may be imaged by the spectrometer 118. Thus, the mask 400 adjustably defines a portion of the analytical gap 104 that may be imaged by the spectrometer 118.

In some embodiments, the curtains 402 and 404 are operated by respective stepper motors 424 and 428 through respective rack-and-pinion gear couplings. Screw drives or other suitable couplings may be used. The motors 424 and 428 may be driven by respective motor drive circuits 430 and 434 under control of the processor 120. In other embodiments, the curtains 402 and 404 are operated by any suitable mechanical, hydraulic, pneumatic, piezoelectric, electromagnetic or other actuators, microactuators or combinations thereof. In one embodiment, the analytical gap 104 is about 3-5 mm, and the curtains 402 and 404 and the actuators are configured to move the curtains 402 and 404 in increments of about 0.1 mm. Other (larger or smaller) analytical gaps and curtain increments may be used.

Figure 4:
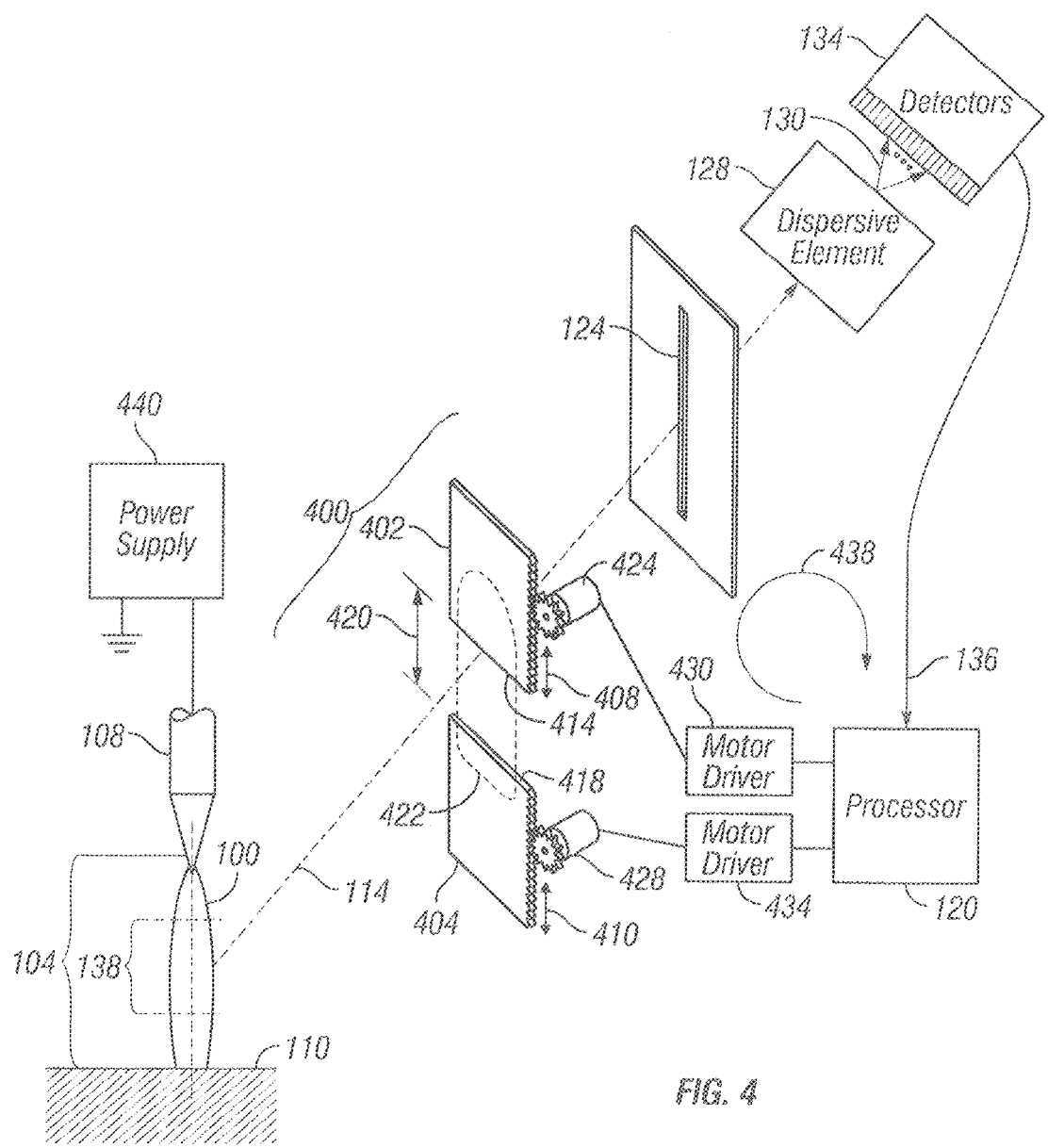
FIG. 4 is a schematic diagram showing components of an OES analyzer, according to an embodiment of the present invention.

Optionally, position sensors, encoders or resolvers (not shown) may be disposed to detect the positions of the curtains 402 and 404 or the actuators and to provide signals representing these positions to the processor 120. Thus, the curtains 424 and 428 may be controlled by the processor 120 in an open-loop fashion or as part of a servomechanism. The curtains 402 and 404 may be flat, as shown in FIG. 4, or the curtains 402 and 404 may be curved or another suitable shape, based on optical and mechanical considerations, such as fitting the curtains and actuators in an instrument without interfering with light paths. Optionally (not shown), only one of the curtains 402 or 404 may be operated by a first actuator, and the other curtain may be fixed, with respect to a moveable carriage to which the first actuator is attached. A second actuator may be coupled to the carriage to control its position.

The processor 120 may execute program code to process the signals 136 from the detectors 134 and, in response, cause one or both of the curtains 402 and 404 to move in order to meet a predetermined criterion or to facilitate analysis of the sample 110. For example, the size and/or position of the opening 420 in the mask 400 may be adjusted to maximize the heights of the lines 200, etc. (FIG. 2). This may be accomplished by enlarging the opening 402 to admit more light 114, or by translating the opening 402 such that a more fruitful portion of the plasma 100 is imaged by the spectrometer 118. In general, the mask 400 may be adjusted to maximize the detected strengths of the emissions that characterize the sample 110. Optionally or alternatively, the size and/or position of the mask 400 may be adjusted to minimize the amplitude of the noise 204 or 300 (FIGS. 2 and 3), to maximize the signal-to-noise ratio, or to meet another predetermined criterion or several predetermined criteria or according to another algorithm or heuristic (collectively referred to herein as a "criterion").

In general, unwanted emissions caused by the counterelectrode 108 and by the surface 110 result in a broad "hump" of noise 300 (FIG. 3), with the noise level being highest near the center of the wavelength range depicted, and the noise level being lower at longer and at shorter wavelengths, as shown. The general hump shape of the noise 300 profile may be used by the processor 120 to distinguish noisy spectral data from spectral data that is less noisy, as exemplified by the relatively flat noise profile 204 in FIG. 2. The cooler region of the plasma 100 may exhibit a more well-defined "hump" as a result of thermal recombination than the hotter region of the plasma 100.

In some embodiments, the processor 120 analyzes the signals 136 from the detectors 134 and, based on results of the analysis, causes one or more of the curtains 402 and 404 to move a specified amount in a specified direction. For example, if analysis of the signals 136 indicates that the signal strength, i.e., the heights of the lines 200, etc., (FIG. 2) is insufficient to meet the criterion, the processor 120 may cause one or both of the curtains 402 and 404 to open by a desired step amount (such as about 0.1 mm), i.e., to increase the size of the opening 420, thereby admitting more of the light 114 to be processed by the spectrometer 118. After the curtains 402 and/or 404 achieve their new positions, the processor 120 may analyze fresh signals 136 and again determine if the criterion is met. If the criterion is not met, the processor 120 repeats by further opening the curtains 402 and/or 404 (unless the curtains 402 and 404 can not be opened further) and analyzes fresh signals 136. Thus, the mask 400, the spectrometer 118 and the processor 120 operate as a feedback system, as indicated by arrow 438.

The processor 120 may, but need not, directly or indirectly control operation of a power supply 440 that provides electrical power to the counterelectrode 108 to cause sparks and/or arcs between the counterelectrode 108 and the sample surface 110. If the processor 120 directly or indirectly (such as through another processor) controls the power supply 440, the processor may coordinate generating sparks/arcs with the above-described analysis of the signals 136 from the detectors 134. For example, the processor 120 may cause one or more sparks/arcs to be generated each time fresh signals 136 are required, i.e., before or after each adjustment of the positions of the curtains 402 and 404, until the criterion is met. If the polarity of the counterelectrode 108 and the sample surface 110 are reverses, such as to clean the counterelectrode 108, the hotter and cooler ends of the plasma 100 exchange positions. Thus, the curtain positions may need to be adjusted correspondingly.

An arc/spark-based OES analysis sequence typically begins with about 200 to 500 sparks to prepare the surface 110 of the sample. These sparks burn off or evaporate surface contaminants, as well as melt and re-melt a portion of the surface 110 to blend the sample, thereby yielding a more representative elemental composition of the sample. After this surface preparation phase has been completed, additional sparks/arcs are generated to analyze the sample, as described above.

Conventionally, no analysis of the sample is performed during the surface preparation phase. However, in some embodiments, light 114 resulting from some or all of the surface preparation sparks may be analyzed to adjust the curtains 402 and 404. In one embodiment, some or all of the surface preparation sparks are used to determine the base material, such as iron, aluminum, zinc or titanium, of the sample 110. This determination need not necessarily identify other constituents or the alloy of the sample 110. However, identifying the base material of the sample 110 enables the processor 120 to at least preliminarily adjust the mask 400.

For example, because the portion of the plasma 100 close to the sample surface 110 is hotter than the portion of the plasma 100 close to the counterelectrode 108, the mask 400 may be adjusted to image the portion of the analytical gap 104 that is of a preferred temperature, based on the base material of the sample 110. Iron-based materials require higher temperatures than aluminum-based materials to emit comparable intensities of light 114. Thus, if the base material is determined to be iron, the curtains 402 and 404 may be adjusted so the opening 402 images a hotter portion of the plasma 100. However, if the base material is determined to be aluminum, the curtains 402 and 404 may be adjusted so the opening 402 images a cooler portion of the plasma 100.

Similarly, hard line emissions emanate from the hotter portion of the plasma 100. Conversely, soft line emissions emanate from the cooler portion of the plasma 100. A given sample may include both hard line elements and soft line elements. After the surface preparation phase, while the sample 110 is being analyzed, the opening 420 may be translated to image different temperature portions of the plasma 100, essentially sweeping through the available plasma temperatures, so as to generate the maximum amount of light 114 from each element in the sample 110, although not necessarily generating the maximum amount of light 114 from all of the elements at the same time. This sweeping ability is one factor that obviates the need for a compromise mask size and position combination used in the prior art.

Figure 6:
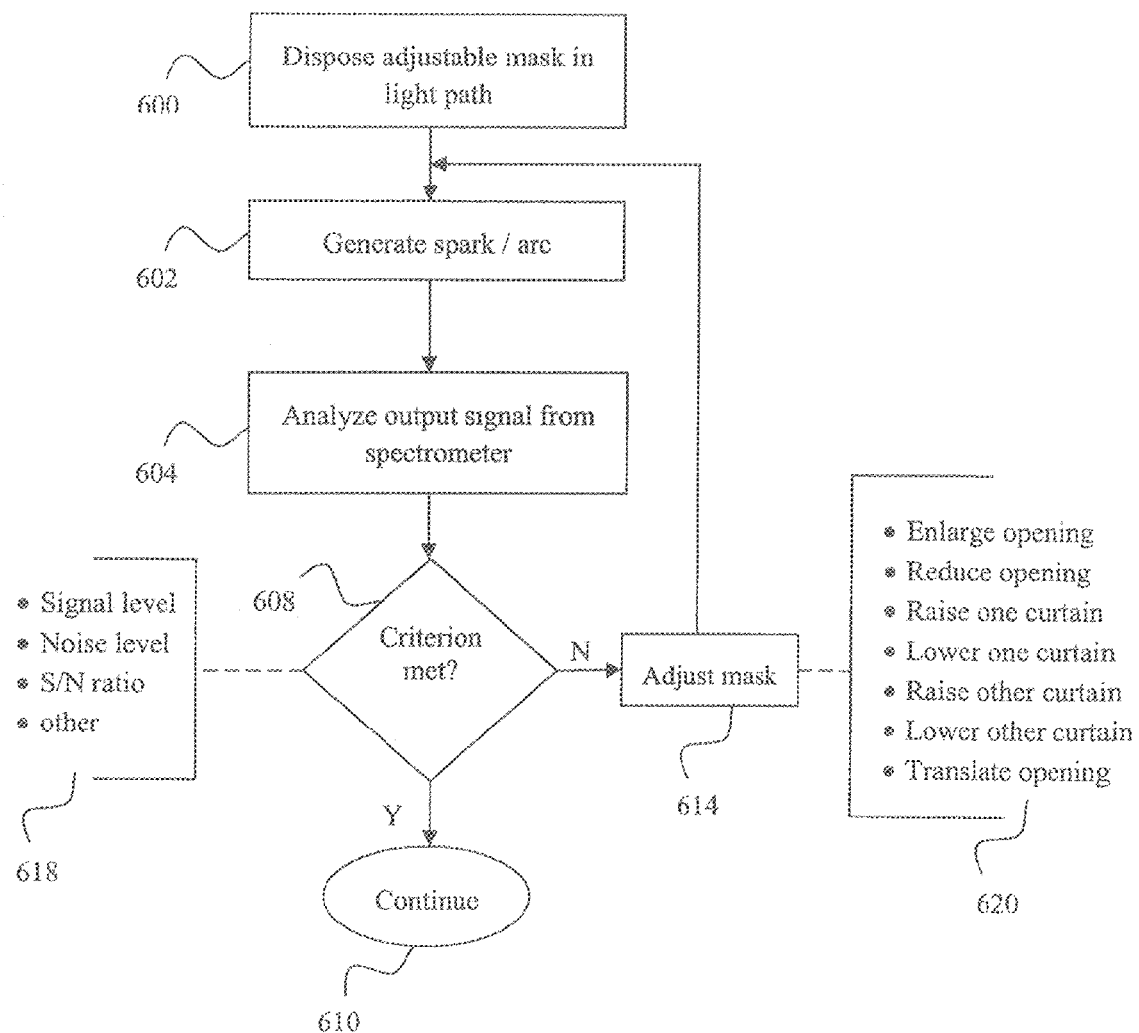
FIGS. 6-10 are flowcharts depicting processes for adjusting masks, according to various embodiments of the present invention.

FIG. 6 contains a flowchart depicting operations that may be performed, according to one embodiment. In general, the flowchart of FIG. 6 depicts a process for adjusting a mask until a predetermined criterion is met. At 600, an adjustable mask is disposed in a light path, such that the mask adjustably defines a portion of an analytical gap imaged by a spectrometer. This operation may be performed when an OES instrument is manufactured or retrofitted with the adjustable mask. At 602, one or more sparks and/or arcs are generated, thereby creating plasma. At 604, light from the analytical gap is analyzed by the spectrometer. At 608, if a predetermined criterion is met, control passes to 610, where analysis of the sample continues. However, if the predetermined criterion is not met, control passes to 614, where the mask is adjusted under control of a processor. Thereafter, control returns to 600.

As indicated at 618, the criterion may require: receipt of at least a minimum signal level; at least a minimum average signal level over a specific range of wavelengths; at least a minimum signal level for one or more specific wavelengths; at most a maximum noise level; at most a maximum average noise level; at most a maximum noise level at a specific wavelength or within a specific range of wavelengths; at least a minimum signal-to-noise (S/N) ratio; or at least a minimum S/N ratio at a specific wavelength or within a specific range of wavelengths. The criterion may involve adjusting the mask to: maximize signal level; minimize noise; maximize S/N; or another criterion. For example, the bottom curtain may be opened progressively wider until the noise level (presumably from surface recombination) begins to rise or the noise reaches a predetermined value or the S/N ratio reaches a predetermined value. Optionally, after reaching such a point, the curtain may be closed by a small predetermined amount or until the noise level drops.

A criterion may involve varying a mask parameter, such as the location of the top edge of the bottom curtain, throughout a range of possible values (such as the entire range of possible curtain edge positions) and analyzing the output signals from the spectrometer after each or some of the possible curtain-edge locations, then setting the mask parameter according to which curtain position value provided the best signal level, the best noise level, the best S/N, etc. If a range of curtain edge positions provided equally good results, the mask parameter may be set to the middle of the range. As noted, the criterion may include a combination of criteria.

As indicated at 620, the mask adjustment may include: enlarging the opening defined by the mask; reducing the size of the opening; raising or lowering one or the other of the curtains; translating the opening; or a combination thereof. The flowchart depicts a loop. Additional stopping criteria (not shown), such as reaching an adjustability limit of the mask or performing a predetermined maximum number of iterations, may be employed, as is well known in the art of computer programming.

Figure 7:
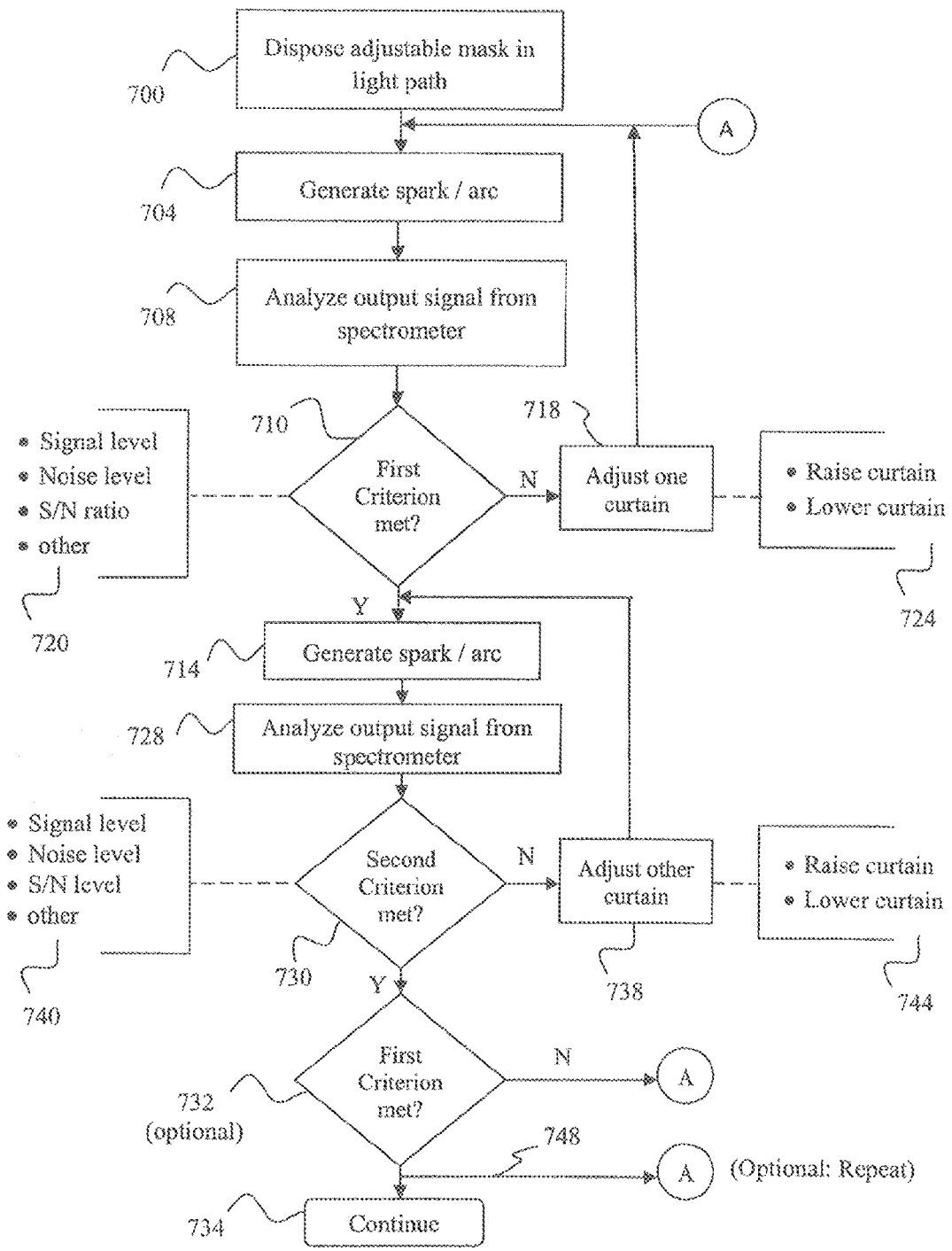

FIG. 6 depicts a process for adjusting a mask until a predetermined criterion is met. Thereafter, full analysis of the sample may commence at 610. In another embodiment, as depicted in a flowchart in FIG. 7, the mask may be adjusted until one criterion is met, then the mask may be further adjusted until a second criterion is met, before full analysis commences. In particular, each curtain may be separately adjusted. For example, the top curtain may be progressively raised to a position where the admitted signal level is high, but optical signals from the counterelectrode's influence are blocked. Then, the bottom curtain may be progressively lowered to a position where the admitted signal level is high, but optical signals from the surface's influence remain blocked.

At 700, an adjustable mask is disposed in a light path, such that the mask adjustably defines a portion of an analytical gap imaged by a spectrometer. At 704, one or more sparks and/or arcs are generated, thereby creating plasma. At 708, light from the analytical gap is analyzed by the spectrometer. At 710, if a first predetermined criterion is met, control passes to 714. However, if the first predetermined criterion is not met, control passes to 718, where the mask is adjusted under control of a processor. Thereafter, control returns to 704.

As noted at 720, the first predetermined criterion may be similar to any of the criteria discussed with respect to FIG. 6. As noted at 724, the mask may be adjusted by raising or lowering the curtain.

At 714, one or more sparks and/or arcs are generated, thereby creating plasma. At 728, light from the analytical gap is analyzed by the spectrometer. At 730, if a second predetermined criterion is met, control passes to 734, where full analysis of the sample may commence. However, if the second predetermined criterion is not met, control passes to 738, where the mask is adjusted under control of a processor. Thereafter, control returns to 714.

As noted at 740, the second predetermined criterion may be similar to any of the criteria discussed with respect to FIG. 6. As noted at 744, the mask may be adjusted by raising or lowering the other curtain. The flowchart depicts two loops. Additional stopping criteria (not shown), such as reaching an adjustability limit of a curtain or performing a predetermined maximum number of iterations, may be employed, as is well known in the art of computer programming.

It is possible that each of the two adjustments, i.e., operations (704, 708, 710 and 718) and operations (714, 728, 730 and 738), influences the other adjustment. Thus, if the second criterion is met at 730, a check may be performed at 732 to determine if the first criterion is still met. If not, control may return to 704. Optionally, as indicated at 748, the two adjustments may be repeated a predetermined number of times or until a third criterion (such as a change smaller than a predetermined amount is made during a given iteration) is met.

Figure 8:
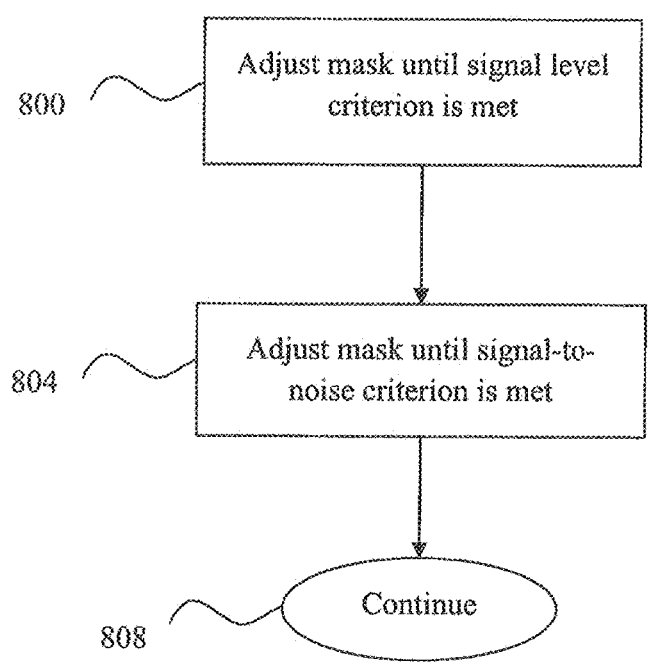

In yet other embodiments, the mask may be adjusted in two phases, although both curtains may be adjusted during each phase. One such embodiment is described with reference to a flowchart in FIG. 8. At 800, the mask is adjusted to meet a signal level criterion, such as maximizing signal level, and then at 804, the mask is adjusted to meet a S/N criterion, such as maximizing S/N. Each operation, 800 and 804, may be performed according to the description provided above, with respect to FIG. 6. After both criteria are met, full analysis of the sample may commence at 808.

Figure 9:
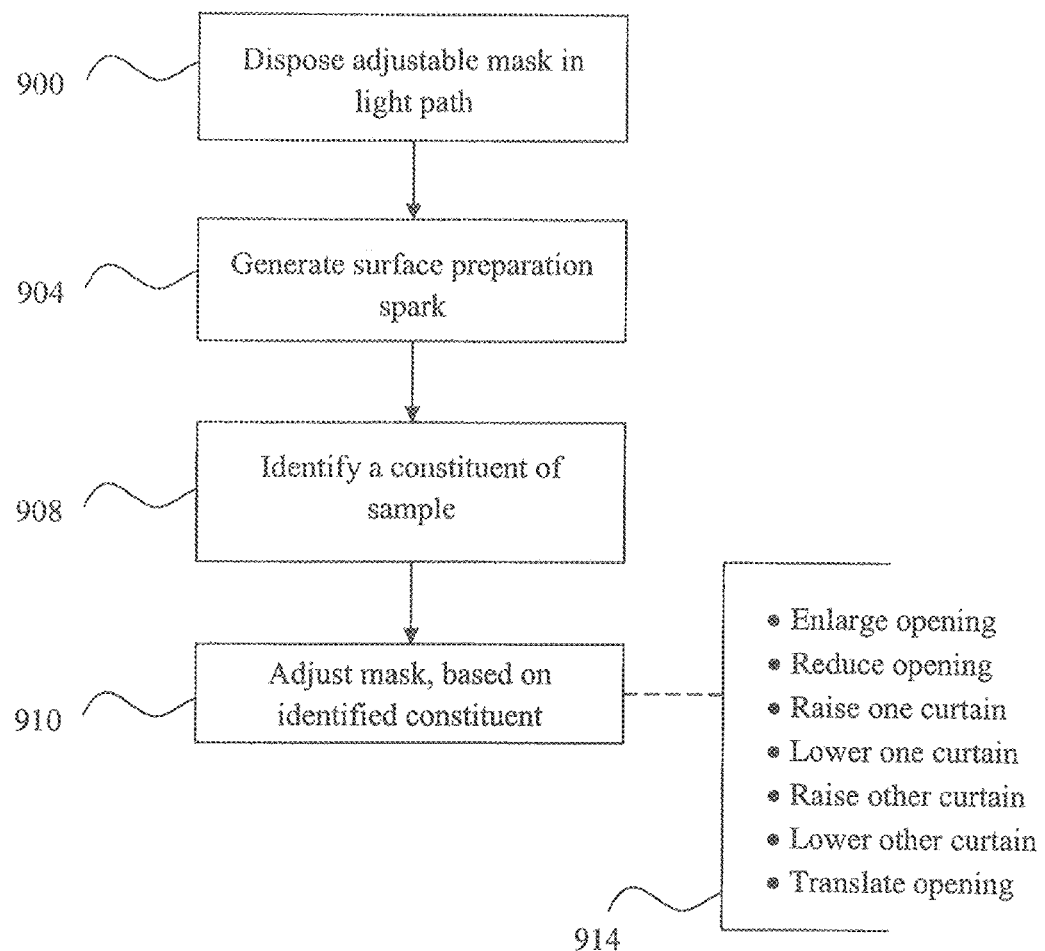

FIG. 9 contains a flowchart depicting operations that may be performed, according to another embodiment. In general, the flowchart of FIG. 9 depicts adjusting a mask during a surface preparation phase. At 900, an adjustable mask is disposed in a light path, such that the mask adjustably defines a portion of an analytical gap imaged by a spectrometer. At 904, one or more surface preparation sparks and/or arcs are generated. At 908, light from the analytical gap is analyzed by the spectrometer and a processor, and the processor thereby identifies a constituent (such as a base material) of a sample. At 910, the mask is adjusted by the processor, based on the identified constituent. As indicated at 914, the mask adjustment may include: enlarging the opening defined by the mask; reducing the size of the opening; raising or lowering one or the other of the curtains; translating the opening; or a combination thereof. For example, for iron-based samples, the mask opening may be translated toward the hotter portion of the plasma, whereas for aluminum-based samples, the mask may be translated toward the cooler portion of the plasma.

Figure 10:
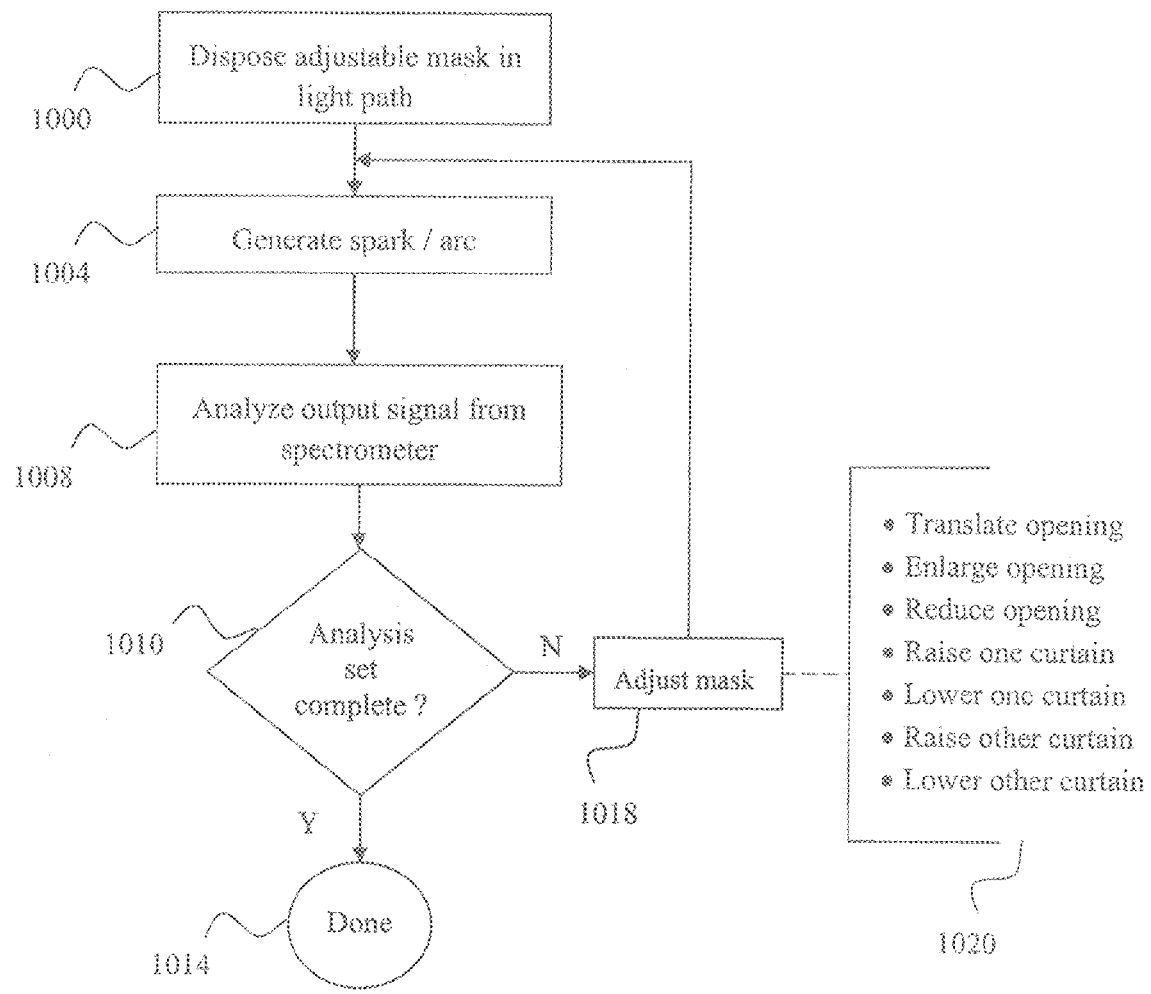

FIG. 10 contains a flowchart depicting operations that may be performed, according to yet another embodiment. In general, the flowchart of FIG. 10 depicts a process for scanning the analytical gap to image different temperature portions of a plasma, so as to generate the maximum amount of light from a number of different elements in the sample, where each element's emissions may peak at a different temperature. At 1000, an adjustable mask is disposed in a light path, such that the mask adjustably defines a portion of an analytical gap imaged by a spectrometer. At 1004, one or more sparks and/or arcs are generated, thereby creating the plasma. At 1008, light from the analytical gap is analyzed by the spectrometer and a processor. At 1010, if the analysis set is complete, control passes to 1014, otherwise control passes to 1018, where the mask is adjusted.

As indicated at 1020, the mask adjustment may include translating the opening defined by the mask; enlarging the opening; reducing the size of the opening; raising or lowering one or the other of the curtains; or a combination thereof. An analysis set may include a number of spark/arc-spectral analysis operation pairs, i.e., operation 1004 followed by operation 1008. For example, data from a number of spark/arc-spectral analysis operation pairs may be averaged together or otherwise statistically processed to improve signal-to-noise. As indicated at 1018, the mask may be adjusted, such as by translating the opening to image a different temperature portion of the plasma, after each spark/arc-spectral analysis operation pair.

Optionally, operations 1004 and 1008 may be repeated a number of times before operation 1010. In other words, operations 1004 and 1008 may be repeated a number of times while the mask remains unchanged, then the mask may be adjusted before operations 1004 and 1008 are again repeated a number of times.

The flowchart depicts a loop. Additional stopping criteria (not shown), such as reaching an adjustability limit of the mask or performing a predetermined maximum number of iterations, may be employed, as is well known in the art of computer programming.

Figure 11:
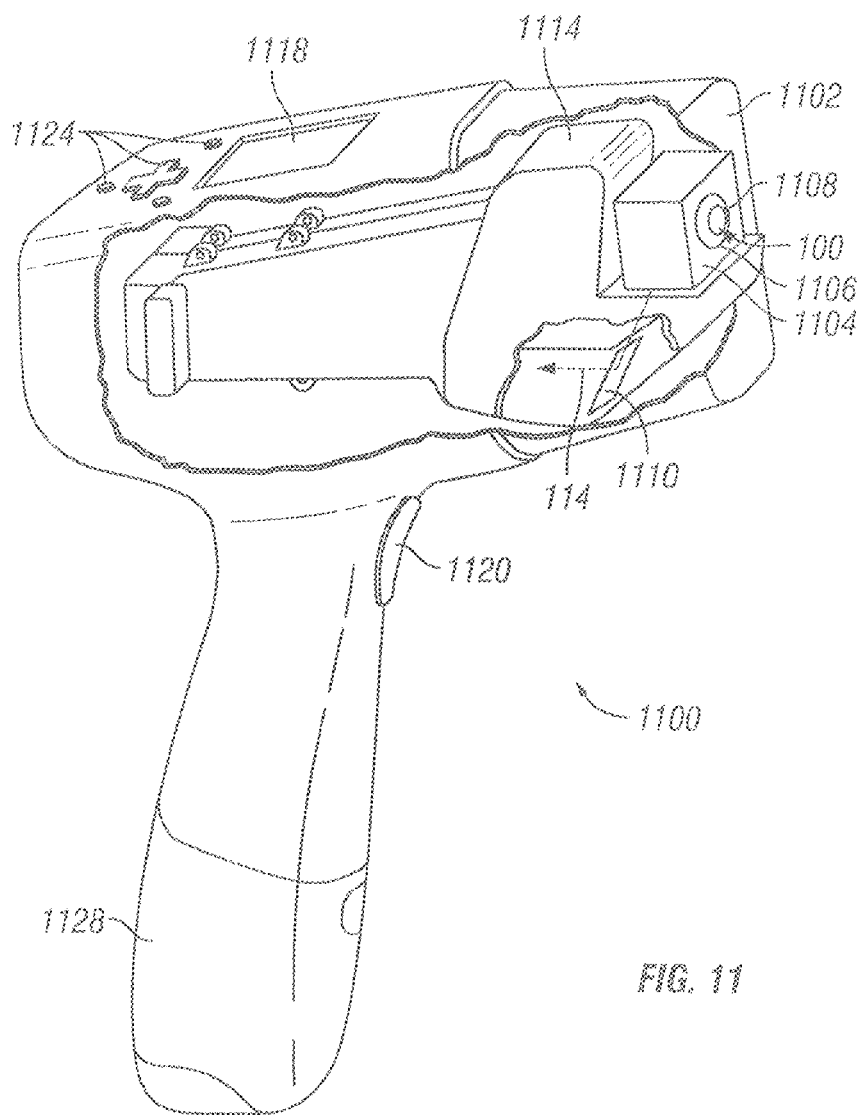
FIG. 11 is a perspective cut-away view of a self-adjusting OES instrument, according to an embodiment of the present invention.

The above-described adjustable mask and methods for automatically adjusting a field of view of an OES instrument may be used in bench-top and hand-holdable OES instruments. FIG. 11 is a cut-away view perspective view of a self-adjusting, hand-holdable OES instrument 1100 for analyzing composition of a portion of a sample, according to one embodiment.

In operation, an electrically-conductive flat portion 1102 of the instrument 1100 is pressed against an electrically-conductive sample surface (not shown). An electrically insulated block 1104 defines a bore 1106, in which the counterelectrode 100 is disposed. A spark from a counter-electrode 100 to the sample excites a portion of the sample, thereby producing an optical signal. The optical signal enters a port 1108 and may be reflected by one or more mirrors (one of which is visible at 1110) into a spectrometer 1114 inside the instrument 1100. A processor (not visible) is coupled to a set of detectors (not visible) in the spectrometer 1114. The processor is programmed to process signals from the detectors.

The processor analyzes at least a portion of a spectrum produced by the spectrometer 1114 to identify and quantify elemental composition of the sample. The processor may display results of the analysis on a touchscreen 1118. A user initiates analysis by the instrument 1100 via a trigger switch 1120. Additional pushbuttons 1124 enable the user to further interact with the processor. A (typically rechargeable) battery 1128 powers the instrument 1100.

Aspects of the spectrometer 1114, as well as integration of the adjustable mask into the instrument 1100, are described below. Additional information about such an instrument is available in U.S. patent application Ser. No. 12/036,039, titled "Hand-Held, Self-Contained Optical Emission Spectroscopy (OES) Analyzer," filed Feb. 22, 2008, which is incorporated by reference as if fully set forth herein for all purposes.

Figure 12:
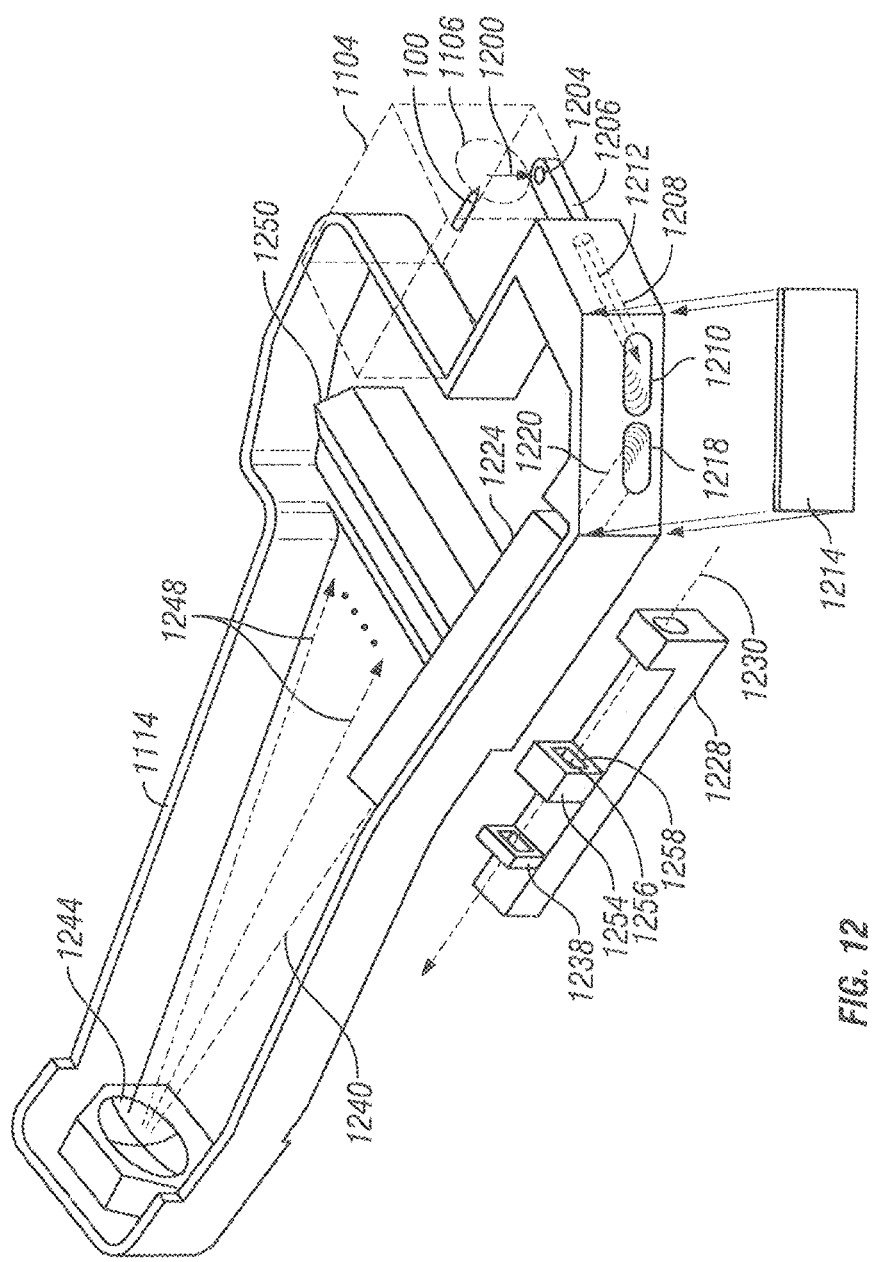
FIG. 12 is a perspective view of a spectrometer in the self-adjusting OES instrument of FIG. 11.

FIG. 12 is a perspective view of the spectrometer 1114 with its cover removed. The block 1104 and bore 1106 of FIG. 11 are shown in phantom. An optical signal 1200 from a plasma within an analytical gap enters a port 1204 and is reflected by a first mirror (not visible, but indicated at 1206) into a bore 1208 (shown in phantom) and exits a second port 1210, thus following an optical path 1212. A second mirror 1214 (shown removed for clarity) reflects the optical signal into a third port 1218, and then the optical signal then travels through a second bore 1220 (shown in phantom) to an optical subassembly 1224.

In some cases (an example of which is shown in FIG. 12), the spectrometer 1114 is cross-dispersed, although this aspect of the spectrometer is not germane to the present invention. The optical subassembly 1224 is also shown removed from the spectrometer 1114 and with its cover removed at 1228. The optical signals 1230 pass through a prism 1238. A dispersed optical signal 1240 impinges on a grating 1244, and a cross-dispersed optical signal 1248 is projected on a plurality of detectors 1250. In non-cross-dispersed cases, the prism 1238 may be omitted. The detectors 1250 are electrically coupled (not shown) to the processor (not shown).

In some cases, the first mirror 1206 is flat, and in other cases the mirror 1206 is powered. Similarly, the second mirror 1214 may be flat or powered. The mirrors 1206 and 1214 may be parabolic, toroidal or shaped according to another simple or compound curve. The two mirrors 1206 and 1214 need not have identical shapes. The choice of number of mirrors, mirror placement, mirror shape, mirror size and other parameters may be informed by overall optical, size, weight and other objectives of the spectrometer 1114.

In the optical subsystem 1228, the optical signal 1230 enters an adjustable mask 1254 having upper and lower curtains 1256 and 1258, respectively. The adjustable mask 1254 should be located at a focal point along the optical path 1208 and 1230 or close to the emission origin. Depending on the parameters of the mirrors 1206 and 1214, one or more focal points may lie along the optical path 1208 and 1230. For example, instead of, or in addition to, a focal point where the adjustable mask 1254 is shown in FIG. 12, a focal point may lie at another point along the optical path 1208 and 1230. Thus, the adjustable mask need not necessarily be located as shown in FIG. 12.

Furthermore, depending on the parameters of the mirrors 1206 and 1214, an image produced at one of the focal points may be larger than an image produced at the other focal point(s). It may be advantageous to locate the adjustable mask 1254 at the focal point that produces the larger image, because the amount of the image passed or blocked by an adjustable mask so located can be controlled with more precision, without requiring more precise curtain positioning. For example, if a 4 mm tall image is produced at one focal point, and a 2 mm image is produced at another focal point, 0.1 mm increments in curtain positioning provide more precise control over the amount of the 4 mm tall image admitted by the mask than over the amount of the 2 mm tall image admitted by the mask.

Figure 5:
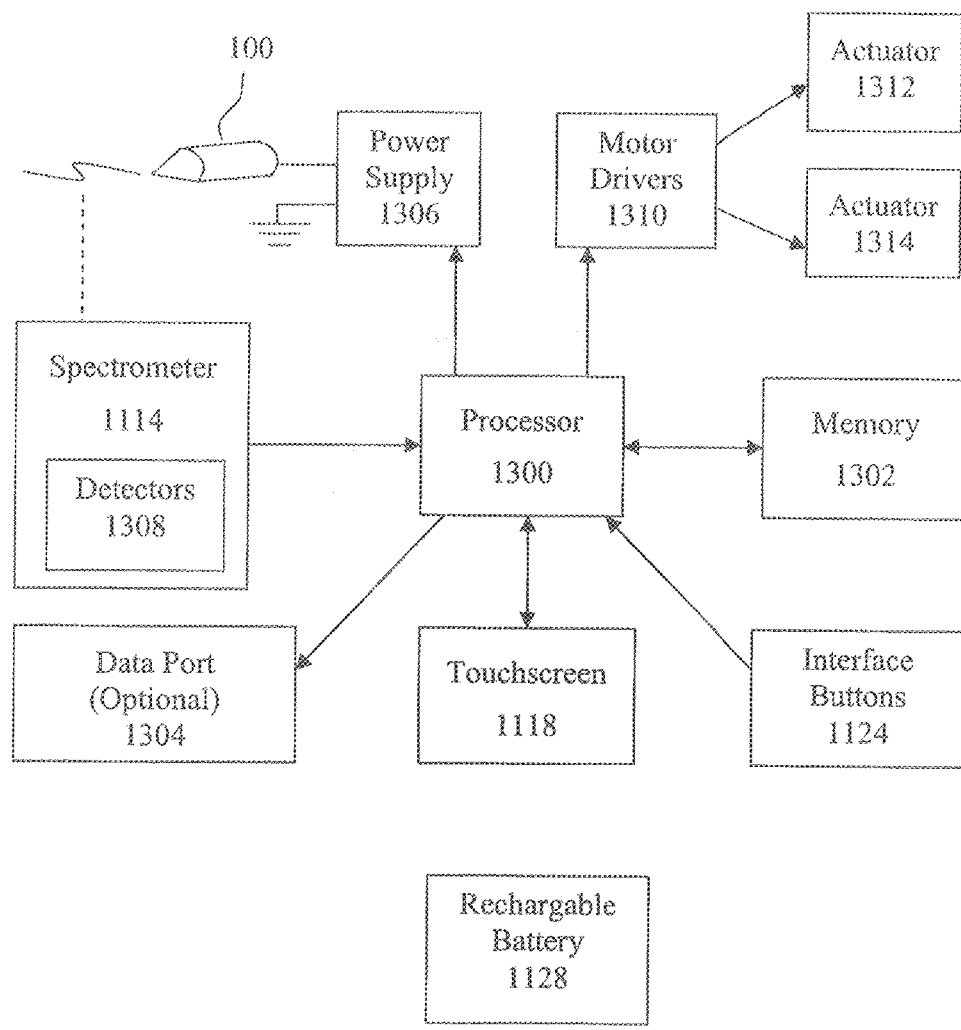
FIG. 5 is a block diagram of major components and subsystems of the self-adjusting OES instrument of FIG. 11.

FIG. 5 is a block diagram of major components and subsystems of the test instrument 1100 of FIG. 11. Instructions for a processor 1300, as well as spectral feature prototypes, may be stored in a memory 1302. Analytical results from samples may also be stored in the memory 1302 and may be displayed on the touchscreen 1118 and/or provided to an external device via a wired or wireless data port 1304. In addition, the memory 1302 may store tables of compositions of known materials (such as alloys) for comparison to compositions of test samples, and results of this comparison may be displayed on the screen 1118 and/or provided via the port 1304.

The processor 1300 controls a power supply 1306 to generate sparks/arcs, as needed. The processor 1300 receives output signals from detectors 1308 within the spectrometer 1114. The processor controls motor drivers 1310, which drive actuators 1312 and 1314, which operate the upper and lower curtains, respectively.

Embodiments of the present invention provide advantages over the prior art. For example, use of an adjustable mask facilitates conserving electrical power. Power conservation is important in hand-holdable, battery-powered analytical instruments. Light output from the plasma is typically related to power input into the analytical gap. However, as noted, in conventional OES instruments, fixed masks are typically configured according to a compromise between several competing objects (such as being able to analyze iron-based materials and aluminum-based materials), and the masks are not optimized for either objective. Consequently, to generate sufficient light for a spectrometer to analyze, a conventional instrument must use more power than would be necessary if the mask were optimized. The present invention enables the mask to be optimized. Thus, for each base material, the mask may be adjusted, and a minimum amount of electrical power may be used, thereby extending battery life.

Designing and manufacturing hand-holdable OES instruments present greater challenges than those faced in relation to bench-top OES instruments. For example, counterelectrode-to-sample gaps are typically smaller (about 2 mm) in hand-holdable instruments than in bench-top instruments (about 3-5 mm). Thus, mask opening size and position are more critical in hand-holdable instruments. For example, a placement error of, say, 0.3 mm is about twice as significant in a hand-holdable instrument than the same error is in a bench-top instrument. The ability of a hand-holdable instrument equipped with an adjustable mask to image an automatically selected portion of an analytical gap enables the instrument to dynamically select an optimum mask opening size and position, thereby streamlining manufacturing and service of the instrument, because critical adjustments to the mask need not be made manually.

In addition, hand-holdable instruments are typically used in the field where samples are typically not prepared as well as for bench-top analysis and where they are sometimes not prepared at all. Field samples typically have more surface irregularities than polished bench-top samples. The flexibility to image a dynamically-selected portion of an analytical gap enables a hand-holdable instrument to compensate for variabilities in field samples.

Furthermore, counterelectrode-to-sample distances are likely to vary more when hand-holdable instruments are used than for bench-top instruments. The flexibility to image a dynamically-selected portion of an analytical gap enables hand-holdable instruments to accommodate these variations, as well as other variations that are likely to occur with both hand-holdable and bench-top instruments, such as: shortening of counterelectrodes over time due to wear; instrument-to-sample misalignment by operators; instrument aging; thermal expansion and contraction of input optics; and lack of rigid mechanical coupling between input optics and spectrometer.

A self-adjusting OES instrument has been described as including a processor controlled by instructions stored in a memory. The memory may be random access memory (RAM), read-only memory (ROM), flash memory or any other memory, or combination thereof, suitable for storing control software or other instructions and data. Some of the functions performed by the instrument have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

These embodiments are discussed in the context of analytical techniques and test instruments that employ OES; however, the teachings of this application are applicable to other types of analytical test instruments and techniques that employ spectral analysis, including test instruments that employ optical absorption spectroscopy. Furthermore, although the disclosed embodiments are discussed in the context of arc/spark excitation, other forms of excitation, including laser-induced breakdown (LIB) and glow discharge (GD) may be used. In addition, the adjustable mask for a spectrometer and the methods described above may be used in other contexts, such as terrestrial or extraterrestrial astronomy, including in combination with or within telescopes and satellites.

Another variation specifically uses the curved curtains previously mentioned. This can be understood with reference to FIGS. 13 through 15. Referring to FIG. 13, when a laser pulse 2000 interacts with a sample 2004 it generates a plasma plume 2008 which expands outward in direction of arrows 2012. One characteristic of the plume is the development of a temperature gradient between the origin of the laser interaction with the sample and the outer edge of the expanding bubble. As has been demonstrated in Optical Emission Spectroscopy (OES), spectroscopic analysis is enhanced if the light collected and analyzed is from a thermally consistent region. In the case of the expanding gas bubble curved slits help to accomplish this goal. A further enhancement is time resolved spectral intensities of the masked plasma.

FIG. 14 shows a potential implementation of a mask with two curved curtains 2020, 2024 and their initial positions relative to the plasma bubble 2008. The curved curtains 2020, 2024 would be independently moved into position in the directions of arrows 2030, 2034 by a mechanical actuator system (not shown) to achieve optimal spectral characteristics. This could either be implemented as a calibration process during setup or it could be done dynamically utilizing software feedback based on the spectral line intensities driving the actuator system to move the curtains. It is also conceivable that a single slit could be appropriate depending upon the analytical application. FIG. 15 shows one possible position of the curtains 2020, 2024 after movement, and the resulting light 2040 along the arc between curved curtains 2020, 2024 that is collected and sent to the spectrometer for processing and analysis.

While the invention is described through the above-described exemplary embodiments, it will be understood by those of ordinary skill in the art that modifications to, and variations of, the illustrated embodiments may be made without departing from the inventive concepts disclosed herein. For example, although some aspects of a self-adjusting OES instrument and methods for automatically adjusting a field of view of an OES instrument have been described with reference to flowcharts, those skilled in the art should readily appreciate that functions, operations, decisions, etc. of all or a portion of each block, or a combination of blocks, of the flowcharts may be combined, separated into separate operations or performed in other orders. Furthermore, disclosed aspects, or portions of these aspects, may be combined in ways not listed above. Accordingly, the invention should not be viewed as limited by the specific embodiments described herein.

What is claimed is:

1. A method for automatically adjusting a field of view of an optical emission spectroscopic instrument, the instrument defining an analytical gap extending in a direction away from a sample surface and including a spectrometer configured to analyze an optical signal produced within the analytical gap and to generate an output signal representative of the analysis, the method comprising:
   disposing an adjustable mask in a light path of the instrument, such that the mask adjustably defines a portion along the analytical gap imaged by the spectrometer, wherein the mask comprises at least one curved curtain; and
   under control of a processor, adjusting the mask.

2. A method according to claim 1 additionally comprising exciting a portion of the sample with a laser, the excitation producing an optical signal.

3. A method according to claim 1, further comprising:
   under control of the processor, identifying a constituent of a sample based on the output signal;
   wherein adjusting the mask comprises adjusting the mask based on the identified constituent.

4. A method according to claim 3, wherein identifying the constituent is performed during a surface preparation phase.

5. A method according to claim 1, further comprising:
   under control of the processor, analyzing a plurality of time-separated output signals;
   wherein adjusting the mask comprises adjusting the mask between each pair of successive output signal analyses.

6. A self-adjusting optical emission spectroscopic instrument for analyzing composition of a portion of a sample, the instrument comprising:
- a laser for exciting, within an analytical gap which extends in a direction away from a sample surface, the portion of the sample, the excitation producing an optical signal;
- a spectrometer disposed in the instrument to receive the optical signal and operative to disperse the optical signal and produce an output signal from the dispersed optical signal;
- an adjustable mask disposed in the instrument, along a path of the optical signal, such that the mask adjustably defines a portion of the optical signal along the analytical gap imaged by the spectrometer, the mask comprising at least one curved curtain; and
- a processor coupled to the spectrometer and to the mask and programmed to process the output signal and to adjust the mask.

7. An instrument in accordance with claim 6, wherein the processor is programmed to:
- identify a constituent of a sample based on the output signal; and
- adjust the mask based on the identified constituent.

8. An instrument in accordance with claim 7, wherein the processor is programmed to identify the constituent of the sample during a surface preparation phase.

\* \* \* \* \*